United States Patent [19]

Baker

[11] 4,039,777
[45] Aug. 2, 1977

[54] HEATING APPARATUS FOR GLASS OR CERAMIC COOKING VESSEL

[75] Inventor: Fred E. Baker, Asheboro, N.C.

[73] Assignee: General Electric Company, Bridgeport, Conn.

[21] Appl. No.: 698,962

[22] Filed: June 23, 1976

[51] Int. Cl.² ............................................. F27D 11/02
[52] U.S. Cl. ..................................... 219/439; 219/258; 219/424; 219/430; 219/436; 219/442; 219/530; 219/535; 219/536; 323/9
[58] Field of Search ............... 219/258, 345, 429, 430, 219/433, 435, 436, 438, 439, 441, 442, 462, 530, 535, 536, 540; 323/9; 307/128, 146

[56] References Cited

U.S. PATENT DOCUMENTS

| | | | |
|---|---|---|---|
| 1,060,265 | 4/1913 | Lamb | 219/258 X |
| 1,552,813 | 9/1925 | Amman | 219/530 X |
| 2,066,476 | 1/1937 | Lacy | 219/441 |
| 2,573,237 | 10/1951 | Wilcox | 219/441 X |
| 2,676,241 | 4/1954 | Schlumbohm | 219/441 |
| 2,896,125 | 7/1959 | Morton | 323/9 X |
| 3,075,123 | 1/1963 | Faulds | 323/9 X |
| 3,370,156 | 2/1968 | Graves | 219/540 |
| 3,453,416 | 7/1969 | Mekjean | 219/530 |
| 3,786,230 | 1/1974 | Brandenburg, Jr. | 219/345 |
| 3,881,090 | 4/1975 | Scott | 219/433 |

FOREIGN PATENT DOCUMENTS

| | | | |
|---|---|---|---|
| 119,540 | 2/1945 | Australia | 19/258 |

*Primary Examiner*—Volodymyr Y. Mayewsky
*Attorney, Agent, or Firm*—John F. Cullen; George R. Powers; Leonard J. Platt

[57] ABSTRACT

A glass or ceramic cooking vessel of the type commonly employed in slow cookers is provided with heating apparatus for heating the vessel in a substantially uniform manner. An electric heating element is supported in a position spaced from the vessel such that direct conduction of heat to the vessel is prevented, heat transfer means being provided to conduct heat from the heating element to the vessel over an extended portion of the vessel's outer surface.

10 Claims, 5 Drawing Figures

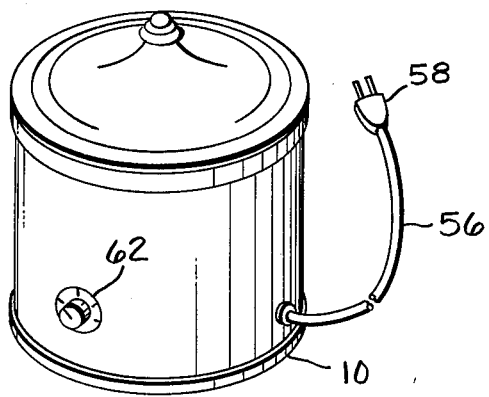
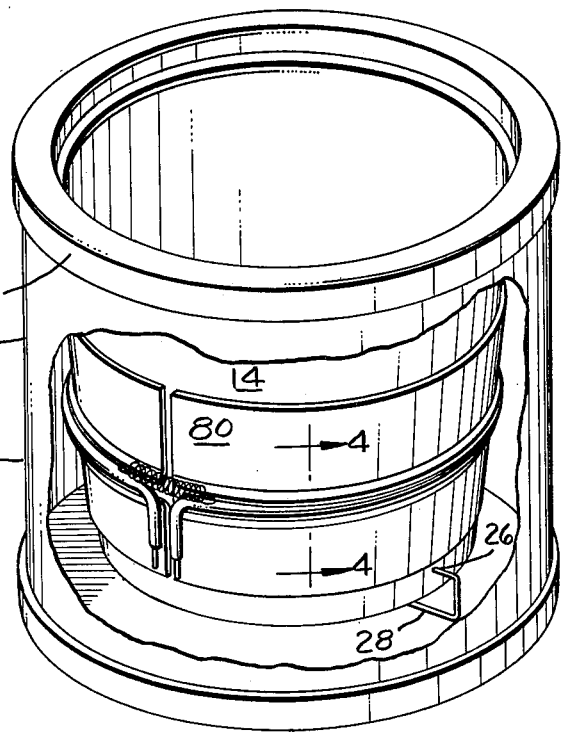
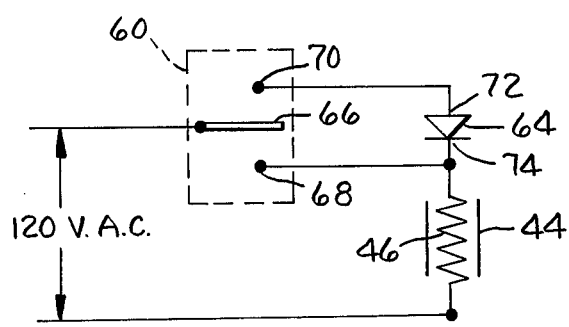
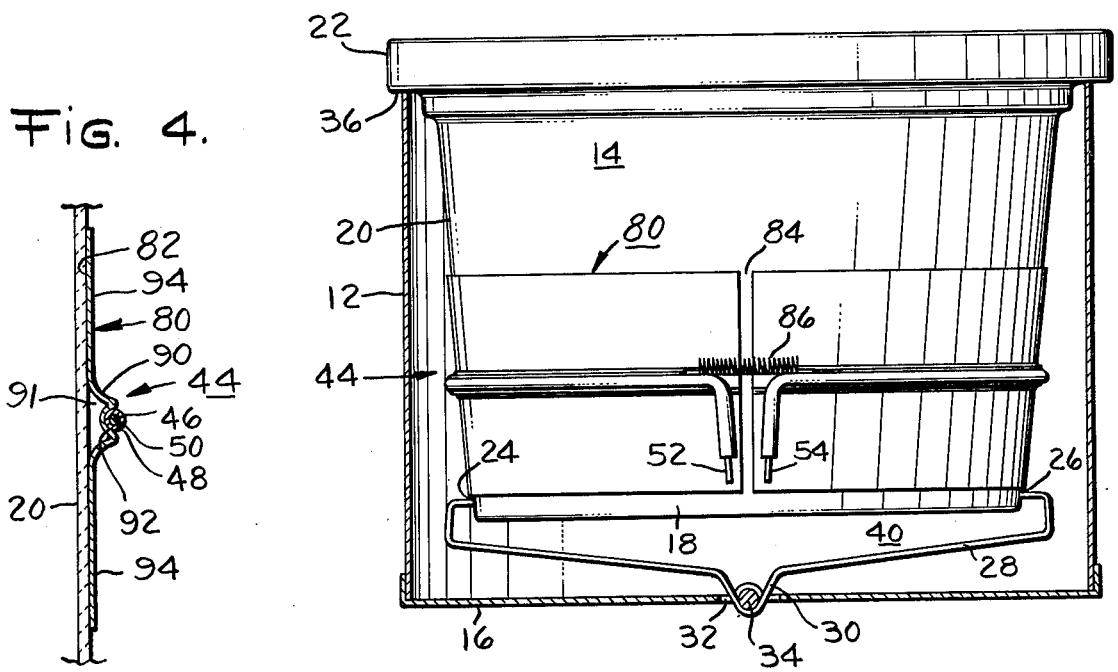

HEATING APPARATUS FOR GLASS OR CERAMIC COOKING VESSEL

BACKGROUND OF THE INVENTION

1. Field of the Invention

This invention relates to apparatus for heating glass of ceramic vessels of the type commonly employed in electric cooking utensils known as slow cookers and, more particularly, to electric heating apparatus for uniformly heating the vessel.

2. Description of the Prior Art

An electric cooking utensil known as a slow cooker typically includes a glass or ceramic cooking vessel which is heated by a relatively low wattage heating element. In such appliances, cooking normally takes place at relatively low temperature over an extended period of time. The heat input to the glass or ceramic vessel can be provided in various ways. One approach is to wrap resistive heater wires directly around the vessel and to secure the wires to the vessel by cement or varnish. Another well-known design has resistive heater wires wrapped about a sheet of asbestos and sandwiched between two sheets of glass cloth, the complete assembly then being wrapped about the vessel. These approaches have the advantage of spreading the heat input across an extended portion of the outer surface of the vessel, the result being substantially uniform heating of the vessel and food contained in the vessel.

Sheath-type heating elements have many characteristics which would make their use advantageous for heating glass or ceramic cooking vessels. A sheath-type heating element includes an electrical resistance element which extends through an outer tubular protective metal sheath, and an electrical insulating compound such as compressed magnesium oxide is provided between the resistance element and the protective sheath to provide electrical isolation. It has not, however, been an easy matter to attach such heating elements to the outer surface of the cooking vessel. In addition, it would not be economically feasible to provide multiple turns of sheath-type heating elements about the cooking vessel; as a result, it has not heretofore been possible to provide uniform heating of the cooking vessel with sheath-type heating elements secured to the outer surface of the vessel.

It has been the practice to provide this type of cooking utensil with means of obtaining multiple heat input rates. Typically, this has been accomplished by providing an additional resistive heat element that can be operated in parallel with the primary heater to obtain a higher rate of heat input.

SUMMARY OF THE INVENTION

It is a primary object of this invention to provide improved electrical heating apparatus for glass or ceramic cooking vessels.

A further object is to provide improved means for mounting a heating element of the sheath-type on a glass or ceramic cooking vessel.

Another object of this invention is to provide substantially uniform heating of a glass or ceramic cooking vessel with a sheath-type or tubular heating element mounted on the vessel.

Yet another object of this invention is to provide simplified means for providing multiple heat input rates to a glass or ceramic cooking vessel.

A still further object is to provide simplified means for providing multiple heat input rates to the cooking vessel from a single heating element.

Briefly stated, in carrying out the invention in one form, an electric cooking utensil including a vessel formed of glass or ceramic material is provided with heating apparatus for heating the vessel in a substantially uniform manner. The heating apparatus includes an electric heating element and a single metallic support strap shaped to provide a first support portion of heat conducting material supporting the heating element in intimate heat exchange contact so as to conduct heat therefrom. A second support portion of heat conducting material intermediate the first support portion and the outer surface of the vessel supports the first support portion and the heating element in fixed positions spaced from the outer surface of the vessel by a dead air space to prevent direct conduction of heat from the heating element to the vessel. The second support portion is in intimate heat exchange contact with both the first support portion and a substantial portion of the outer surface of the vessel such that heat is conducted to the vessel over an extended portion of its outer surface, the vessel thereby being heated in a substantially uniform manner. By a further aspect of the invention, the electric lead means for supplying electric current to the heating element includes power control means for selectively controlling the level of power supplied to the heating element. The power control means may comprise a diode and switching means for selectively switching the diode into and out of series with the heating element.

By a still furher aspect of the invention, the first and second support portions of the metallic support strap comprise an elongated strap peripherally wrapped about a generally cylindrical outer surface of the vessel, the strap having a length slightly less than the circumference of the vessel. The inner surface of the strap conforms to the generally cylindrical outer surface of the vessel, and spring means are provided for connecting the ends of the strap in tension so as to bias the inner surface of the strap into heat exchange contact with the outer surface of the vessel. The first and second support portion may conveniently be formed from a single piece of relatively thin sheet metal to form the single metallic support strap with the sheet metal being bent to maintain the first support portion and the heating element spaced by a dead air space from the outer surface of the vessel. To enhance heat transfer and to facilitate assembly, the sheet metal forming the first support portion is preferably formed to provide a recess for receiving the heating element.

BRIEF DESCRIPTION OF THE DRAWINGS

FIG. 1 is a perspective view of an electric cooking utensil having a glass or ceramic cooking vessel and the improved heating apparatus of this invention;

FIG. 2 is a partially cut-away view similar to FIG. 1 showing the heating apparatus mounted on the glass or ceramic vessel;

FIG. 3 is a cross-sectional view partly in section of the improved heating apparatus shown by FIG. 2;

FIG. 4 is a partial cross-sectional view on line 4—4 of FIG. 2; and

FIG. 5 is a circuit diagram showing schematically the improved power control means of this invention.

DETAILED DESCRIPTION

An electric cooking utensil 10 commonly known as a slow cooker is illustrated by FIGS. 1-3. The slow cooker 10 is typical of these products in that it has a cylindrical metal outer housing 12, a glass or ceramic vessel 14 and a suitable base 16. The vessel 14 includes a bottom wall 18 and a generally cylindrical side wall 20 merging into the bottom wall 18 such that foodstuffs may be received therein for cooking. An annular lip 22 is formed integrally with the upper periphery of the side wall 20, the lip 22 extending radially outwardly of the side wall 20 and the metal housing 12. A pair of diametrically opposed holes 24 and 26 extend into the side wall 20 from it generally cylindrical outer surface near the bottom of the vessel 14, and a bail 28 extending under the bottom wall 18 has its ends received in the holes 24 and 26. A depending portion 30 of the bail is pulled through an opening 32 in the metal base 16 and held in place by a fastening member 34. The bail 28 is preferably made of spring steel or other resilient material which will deform to permit the portion 30 to be pulled through the opening and thereafter bias the lower annular surface 36 of the lip 22 downwardly into sealing contact with the upper edge of the housing 12 so as to prevent foodstuffs, water, and the like from entering the space 40 between the housing 12 and the vessel 14. To assure proper sealing, it may be necessary to provide a suitable sealing gasket between the surface 36 and the upper edge of the housing 12. Except for the novel bail-securing arrangement, the structure thus far described is generally conventional.

The electric heating apparatus of this invention will now be described with particular reference to FIGS. 2-4. As illustrated, a tubular or sheath-type heating element 44 is wrapped about the generally cylindrical outer surface of the side wall 20. As shown by FIG. 4, the sheath-type heating element 44 includes an inner electrical resistance element 46 which extends through an outer tubular protective metal sheath 48. To electrically isolate the metal sheath 48 from the resistance element 46, a dense layer 50 of material such as compressed magnesium oxide is provided between the resistance element 46 and the sheath 48. The ends 52 and 54 of the heating element 44 are connected to electric lead means including a cord 56 extending through the outer housing 12 as illustrated by FIG. 1, the cord 56 terminating in a plug 58 which may be inserted into a standard electrical outlet for providing alternating electrical current to the utensil 10. As illustrated by FIG. 5, the electric lead means also includes a three position switch 60 controlled by knob 62 (see FIG. 1) and a diode 64.

When the plug 58 is inserted into a proper outlet and the wiping blade 66 of the switch 60 positioned as shown by solid lines in FIG. 5, an open circuit condition exists and no heat is produced by the heating element 44. When the switch 60 is set to direct the current flow through terminal 68, the full line voltage is placed across the resistance element 46 and thus the maximum heat output rate is obtained from the heating element 44. By resetting the switch 60 to direct current through terminal 70, the diode 64, which has an anode terminal 72 and a cathode terminal 74, is placed in series with the resistance element 46. The diode 64 provides a low impedance path for current flow between the anode terminal 72 and the cathode terminal 74 only as long as the voltage on the anode terminal 72 is positive with respect to the voltage on the cathode terminal 74. The diode 64 does not permit current flow in a direction between the cathode terminal 74 and the anode terminal 72. Thus, when the switch 60 is set on the terminal 70 and the plug 58 is inserted into a normal household outlet supplying alternating current, the heat output rate of the heating element 44 is reduced to one half of the maximum rate. It will thus be seen that the heating apparatus of this invention provides relatively simple and inexpensive means for providing multiple heat input rates to the cooking vessel 14 from a single heating element 44.

Referring now to FIGS. 2—4, the support arrangement for the sheath-type heater 44 will now be described. An elongated single metallic support strap in the form of strap 80 of aluminum or other good heat conducting material is peripherally wrapped about the generally cylindrical outer surface of the side wall 20 of the glass or ceramic vessel 14. The strap 80 has a length slightly less than the circumference of the vessel 14 and an inner surface 82 which conforms with the outer surface of the side wall 20 at all times. Since the strap 80 has a length slightly less than the circumference of the vessel 14, a gap 84 is provided between the ends of the strap 80 when the inner surface 82 of the strap 80 is contacting the side wall 20 around the entire periphery of the vessel. A spring 86 interconnects the ends of the strap 80 in tension to bias the inner surface 82 of the strap 80 into intimate heat exchange contact with the outer surface of the side wall 20. The gap 84 and the biasing spring 86 assure good heat transfer contact at all times in spite of manufacturing tolerances normally encountered on ceramic vessels and the relative expansion and contraction which occur between the strap and the vessel 14 during use.

As best shown by FIG. 4, the single metallic support strap 80 is formed from a single piece of relatively thin sheet metal bent into the illustrated configuration. More particularly, the central portion of the strap along its length is deformed to form a first support portion 90 projecting radially outwardly of the vessel 14 along substantially the entire length of the strap 80. The first support portion 90 includes an outwardly facing recess 92 sized to snugly receive the heating element 44 in intimate heat exchange contact to promote heat transfer to the strap 80 from the heating element and to facilitate assembly. Since the first support portion 90 is spaced radially outwardly (relative to the vertical axis of the vessel 14) of the outer surface of the side wall 20, a dead air space 91 is formed between the first support portion 90 and the side wall 20. Because of the insulating qualities of the dead air space 91, substantial quantities of heat cannot be directly transferred to the side wall adjacent the first support portion. In this manner, a narrow high temperature band adjacent the heating element 44 is avoided.

The strap 80 also includes a pair of generally cylindrical portions 94 which form a second support portion to hold the first and heating element in fixed position, the inner surface 82 of the strap 80 on the portions 94 conforming to the outer surface of the side wall 20 such that intimate heat exchange contact is provided between the portions 94 and the side wall 20 of the vessel 14. Through appropriate sizing of the strap 80, the contact between the inner surface 82 of the strap and the outer surface of the side wall 20 occurs over a substantial portion of the outer surface of the sidewall 20. Since the spacing of the first support portion 90 and the heating element 44 from the vessel 14 by dead air space 91 assures that heat will not be directly transferred to the vessel along a narrow band, the heat produced by the heating element 44 is largely conducted through the first support means 90 and the second support means 94 to an extended portion of the outer surface of the side wall 20. In this manner, the vessel 14 may be heated in a substantially uniform manner.

The cooking vessel 14 has been described herein as having a generally cylindrical side wall 20. From FIG. 3, it will be noted that the side wall 20 of the illustrated vessel is slightly tapered such that the outer surface of the vessel 14 has the shape of a frustum larger adjacent the annular lip 22 than at the bottom wall 18. The term "generally cylindrical" is intended to embrace all such deviations from the purely cylindrical. It is important to the invention, however, that the inner surface 82 of the strap 80 conform with the outer surface of the side wall 20, whether or not it is cylindrical, in order to assure good surface-to-surface contact and, hence, conduction over an extended area.

Once the strap 80 is mounted on the exterior of the vessel 14, it is desirable that it and the heating element 44 be prevented from shifting axially along the vessel during subsequent use. As illustrated by FIG. 3, downward movement of the strap 80 is prevented by contact by the ends of the bail 28 with the lower edge of the strap 80. Upward movement of the strap 80 and heating element 44 is limited by the outwardly tapered wall 20 in combination with the biasing force exerted by the tension spring 86. If more positive means of preventing upward or circumferential movement of the strap 80 is desired, appropriate stop means may be provided on the vessel 14 above the strap 80 and in the gap 84, or the ends of the bail 28 may extend through mating openings in the strap 80 into holes in the vessel 14.

As illustrated by FIG. 4, the strap 80 comprising the first support portion 90 and the second support portion 94 may be conveniently formed from a single piece of relatively thin sheet metal. Other configurations will readily occur to those skilled in the art. For example, the two support portions may be formed of two or more separate pieces of heat conducting material welded, brazed, or otherwise joined in a heat conducting relationship. Similarly, it will occur to those skilled in the art that the strap need not have the illustrated configuration. For example, the heating element 44 could, if desired, be mounted on the radially inward surface of the first support portion so long as the heating element is held in a position spaced by dead air from the outer surface of the side wall 20 such that heat transfer to the vessel 14 will take place over the extended surface area of the inner surface 82 of the strap 80. Similarly, heat input to the strap 80 can be provided by more than one heating element or even by heating elements having shapes other than the illustrated generally circular configuration. Furthermore, the heat dispersion characteristics of this invention may be used to transmit heat to surfaces having configurations other than generally cylindrical, such as the outer surface of the bottom wall 18 of the cooking vessel 14; it is essential, however, that the support means maintain the heating element out of direct contact with the vessel and that the support means conduct heat to an extended portion of the vessel.

From the foregoing, it will be seen that this invention provides improved electrical heating apparatus for glass or ceramic cooking vessels. Furthermore, the improved heating apparatus provides substantially uniform heating of the glass or ceramic vessel by a heating element of the sheath type. The invention also provides multiple heat inputs to the cooking vessel from a single heating element.

While the invention has been particularly shown and described with reference to a preferred embodiment thereof, it will be understood by those skilled in the art that various changes in form, details, and application may be made therein without departing from the spirit and scope of the invention. A number of such modifications have been described above. Accordingly, it is intended that all such modifications and changes be included within the scope of the appended claims.

I claim:

1. In an electric cooking utensil including a vessel formed of glass or ceramic material having an outer surface, improved electric heating apparatus comprising:
   an electric heating element and electric lead means for applying electric current to said heating element,
   a single metallic support strap shaped to provide a
      first support portion of heat conducting material supporting said heating element in intimate good heat exchange contact on the outer surface therewith so as to conduct heat therefrom, and a
      second support portion of heat conducting material intermediate said first support portion and the outer surface of the vessel supporting said first support portion and said heating element in fixed position spaced from the outer surface of the vessel to provide a dead air space and prevent direct conduction of heat thereto,
      said second support portion being in intimate heat exchange contact with both said first support portion and a substantial portion of the outer surface of the vessel,
   whereby heat is conducted from said heating element to the vessel over an extended portion of its outer surface so as to promote substantially uniform heating of the vessel.

2. Electric heating apparatus as defined by claim 1 in which said electric lead means further comprises power control means for selectively controlling the level of power supplied to said heating element.

3. Electric heating apparatus as defined by claim 2 in which said power control means comprises a diode and switching means for selectively switching said diode into and out of series with said heating element.

4. In an electric cooking utensil including a vessel formed of glass or ceramic material having a generally cylindrical outer surface, improved electric heating apparatus comprising:
   an electric heating element and electric lead means for applying electric current to said heating element, the outer surface of said heating element being electrically isolated from said lead means,
   a single metallic support strap shaped to provide a
      first support portion of heat conducting material supporting said heating element in intimate good heat exchange contact on the outer surface therwith so as to conduct heat therefrom, and a
      second support portion of heat conducting material intermediate said first support portion and the generally cylindrical outer surface of the vessel supporting said first support portion and said heating element in fixed position spaced from the outer surface of the vessel to provide a dead air space and prevent direct conduction of heat thereto, said second support portion peripherally surrounding the generally cylindrical outer surface of the vessel in intimate heat exchange contact with both said first support portion and a substantial portion of the generally cylindrical outer surface of the vessel, whereby heat is conducted from the heating element to the vessel over an extended portion of its generally cylindrical outer surface so as to promote substantially uniform heating of the vessel.

5. Electric heating apparatus as defined by claim 4 in which said metallic support strap second support means comprises:

an elongated strap peripherally wrapped about the generally cylindrical outer surface of the vessel, said strap having a length slightly less than the circumference of the vessel and an inner surface conforming to the generally cylindrical outer surface of the vessel, and spring means interconnecting the ends of said strap in tension to bias the inner surface of said strap into intimate heat exchange contact with the generally cylindrical outer surface of the vessel.

6. Electric heating apparatus as defined by claim 5 in which said heating element is a tubular heating element wrapped about the generally cylindrical outer surface of the vessel.

7. Electric heating apparatus as defined by claim 6 in which said electric lead means further comprises power control means for selectively controlling the level of power supplied to said heating element.

8. Electric heating apparatus as defined by claim 5 in which said strap comprising said first and second support portions is formed from a single piece of relatively thin sheet metal.

9. Electric heating apparatus as defined by claim 5 in which said heating element is a tubular heating element wrapped about the generally cylindrical outer surface of the vessel, said first support portions extending along at least substantially the entire length of said strap and having a recess therein for receiving said heating element.

10. Electric heating apparatus as defined by claim 9 in which said heating element is positioned radially outwardly of said first support portion of said strap.

* * * * *